(12) United States Patent
Kai

(10) Patent No.: US 7,159,731 B2
(45) Date of Patent: Jan. 9, 2007

(54) AIR PURGE VALVE AND FILTER PUMP COVER EMPLOYING SAME

(75) Inventor: Yao Kai, Shanghai (CN)

(73) Assignee: Bestway Inflatables & Material Corp., Shanghai (CN)

( * ) Notice: Subject to any disclaimer, the term of this patent is extended or adjusted under 35 U.S.C. 154(b) by 191 days.

(21) Appl. No.: 10/792,202

(22) Filed: Mar. 3, 2004

(65) Prior Publication Data

US 2004/0200764 A1    Oct. 14, 2004

(30) Foreign Application Priority Data

Mar. 4, 2003    (CN)    ................................ 03 2 29191

(51) Int. Cl.
- *B65D 51/16* (2006.01)
- *F16K 31/44* (2006.01)
- *F16K 24/00* (2006.01)
- *B01D 35/01* (2006.01)
- *B01D 35/27* (2006.01)

(52) U.S. Cl. ................. 220/203.05; 137/583; 210/120; 210/232; 210/416.2; 210/472; 220/203.04; 220/203.05; 220/203.06; 220/203.12; 220/367.1; 251/213; 251/216; 251/346; 251/351

(58) Field of Classification Search ................. 210/120, 210/169, 232, 416.2, 416.3, 416.4, 416.5, 210/436, 472; 137/561 R, 583, 587; 220/200, 220/202, 203.04, 203.05, 203.06, 203.12, 220/360, 367.1; 251/213, 216, 346, 351
See application file for complete search history.

(56) References Cited

U.S. PATENT DOCUMENTS

| | | | | | |
|---|---|---|---|---|---|
| 2,036,665 | A | * | 4/1936 | White et al. | ................... 29/266 |
| 2,893,418 | A | * | 7/1959 | Leventhal | .................... 137/218 |
| 4,778,595 | A | * | 10/1988 | Sable et al. | ................. 210/119 |
| 5,996,608 | A | * | 12/1999 | Hunter et al. | ............... 137/244 |
| 6,957,742 | B1 | * | 10/2005 | Pillart | ......................... 210/436 |
| 2004/0217042 | A1 | * | 11/2004 | Dworatzek et al. | ......... 210/130 |

* cited by examiner

*Primary Examiner*—John Kim
(74) *Attorney, Agent, or Firm*—Norma E. Henderson

(57) ABSTRACT

A filter pump cover according to the invention comprises a filter cap, an air purge valve, and a filter cap retainer. An air purge valve according to the invention is comprised of a valve cap, a screw-threaded portion, and a valve stem having one or more outward-facing inverse hooks at the bottom. The inverse hooks are located at the bottom of the air purge valve stem and hook onto the bottom lip of the hollow central portion of the filter cap retainer to prevent complete removal of the valve stem from the filter cap retainer. The valve screw-threaded portion is interrupted by a valve opening slot on one side that permits the release of air from the pump when the valve is opened. The hollow part of the filter cap retainer mates with and holds the air purge valve by means of the screw threads when the valve is closed. The valve stem has an upper width that is smaller than the inner diameter of the retainer cap hollow part and a lower width at the inverse hooks that is smaller than the diameter of the retainer cap hollow part. Optional fixing slots for capturing the inverse hooks may be present at the bottom of the retainer cap hollow part. Spaces between the inverse hooks enable initial installation and/or complete removal of the valve stem when desired. When in use in a typical system, the filter cap retainer holding the air purge valve is inserted into the top of a filter container. The filter cap retainer is then held in place on the filter container by the filter cap to form the complete filter pump cover, leaving the air purge valve cap accessible through a hole in the top of the filter cap.

14 Claims, 3 Drawing Sheets

AIR PURGE VALVE AND FILTER PUMP COVER EMPLOYING SAME

FIELD OF THE INVENTION

The invention relates to covers and valves for filter pumps and, in particular, to an air purge valve for use with a swimming pool filter pump cover.

RELATED APPLICATIONS

This application claims priority to patent application number 03 2 29191.4, filed in the People's Republic of China on Mar. 4, 2003.

BACKGROUND

Both portable and stationary above-ground swimming pools typically are used with a portable filter pump to clean the swimming pool water. Existing filter pumps generally employ an air purge valve to discharge excess air from the pumping system after the filter is cleaned or replaced or when the system is first initialized. The air purge valve is frequently, though not necessarily, located on the filter pump cover.

A major problem with existing air purge valves is that the valve stem is not interconnected with the pump in a manner that prevents it from being easily separated from the pump. Without any connecting device, the air purge valve stem may be inadvertently removed completely from the pump when opening the valve to release excess air. When this happens, it is normally difficult to screw the valve stem back in due to high water pressure within the pump, making it necessary to reopen the filter pump container in order to reinsert the valve stem. In turn, this requires that the air purge process be repeated before the pump is restarted, resulting in inconvenience for the pump user. Complete removal of the valve stem also increases the likelihood of valve stem loss or breakage.

What has been needed, therefore, is an air purge valve for filter pump products that is designed so that the valve stem is not easily removed from the pump when the valve is opened. What has further been needed is a filter pump cover having an air purge valve with an interconnected valve stem that is not easily removable when the valve is opened.

SUMMARY

These and other objectives are met by the present invention, which is an air purge valve with a valve stem that is designed to hook into a filter pump cover so that it is not easily removed from the cover. The present invention is also a filter pump cover having an air purge valve with an interconnected valve stem that is not easily removable from the cover. The invention solves the problem of inadvertent valve stem removal by providing the air purge valve stem with inverse hooks that prevent complete removal of the valve stem from the pump when the valve is opened to purge the pump system of air. The invention may be used with a wide variety of filter pump covers, or with any other system that may advantageously employ an air purge valve. A particular advantage of the filter cover of the present invention is that air can be released from inside the filter pump by opening the air purge valve, without subsequent difficulty in closing the valve due to water pressure buildup inside the filter pump.

In one embodiment of the present invention, the filter pump cover comprises a filter cap, an air purge valve, and a filter cap retainer. The air purge valve is comprised of a valve cap, a screw-threaded portion, and a valve stem having one or more outward-facing inverse hooks at the bottom. The inverse hooks prevent complete removal of the valve stem from the filter cap retainer. The inverse hooks are located at the bottom of the air purge valve stem and hook onto the bottom of the hollow central portion of the filter cap retainer. Any number of hooks that are found to suit a particular application may be used.

The valve screw threads are interrupted by a valve opening slot on one side that permits the release of air from the pump when the valve is opened. The filter cap retainer has a hollow part at the center that mates with and holds the air purge valve closed by means of screw threads that mate with the corresponding screw threads on the air purge valve. The valve stem has an upper width that is smaller than the inner diameter of the retainer cap hollow part and a lower width at the inverse hooks that is smaller than the diameter of the retainer cap hollow part. In this manner, the inverse hooks fix into the retainer cap, preventing unintentional removal of the valve stem from the retainer cap. Optional fixing slots for capturing the inverse hooks may be present at the bottom of the retainer cap hollow part. Spaces between the inverse hooks enable initial installation and/or subsequent complete removal of the valve stem when desired by squeezing the inverse hooks together slightly and/or by pushing them through the retainer cap hollow part.

When in use in a typical system, the filter cap retainer holding the air purge valve is inserted into the top of a filter container. The filter cap retainer is then held in place on the filter container by the filter cap, forming the complete filter pump cover. When the system is assembled, the air purge valve remains accessible through a hole in the top of the filter cap. To release air, the air purge valve is turned counterclockwise by means of the air purge valve cap. The inverse hooks hitch the valve stem to the retainer cap to prevent the valve stem from pulling out, and air is released from the pump system via the valve opening slot. The present invention therefore eliminates the problems of lost or damaged valve stems and of closing the air purge valve under the high water pressure present after the air is released.

DETAILED DESCRIPTION

The present invention is an air purge valve that is designed so that the valve stem is not easily removed from the valve when the valve is opened. This new design solves the problem of inadvertent valve stem removal by providing the air purge valve stem with inverse hooks that prevent complete removal of the valve stem from the pump when the valve is opened to purge the pump system of air.

The present invention is also a filter pump cover having an air purge valve with an interconnected valve stem that is not easily removable from the cover. In a preferred embodiment, the filter pump cover of the present invention comprises a filter cap, an air purge valve, and a filter cap retainer having a central opening. The air purge valve has a valve stem that has inverse hooks that prevent complete removal of the valve stem. The inverse hooks are located at the bottom of the air purge valve stem and hook onto the bottom of the hollow central opening of the filter cap retainer. The advantage of the filter cover of the present invention is that air may be released from inside the filter pump by opening the air purge valve without encountering difficulty in subsequently closing the valve due to water pressure buildup inside the filter pump.

Figure 1:
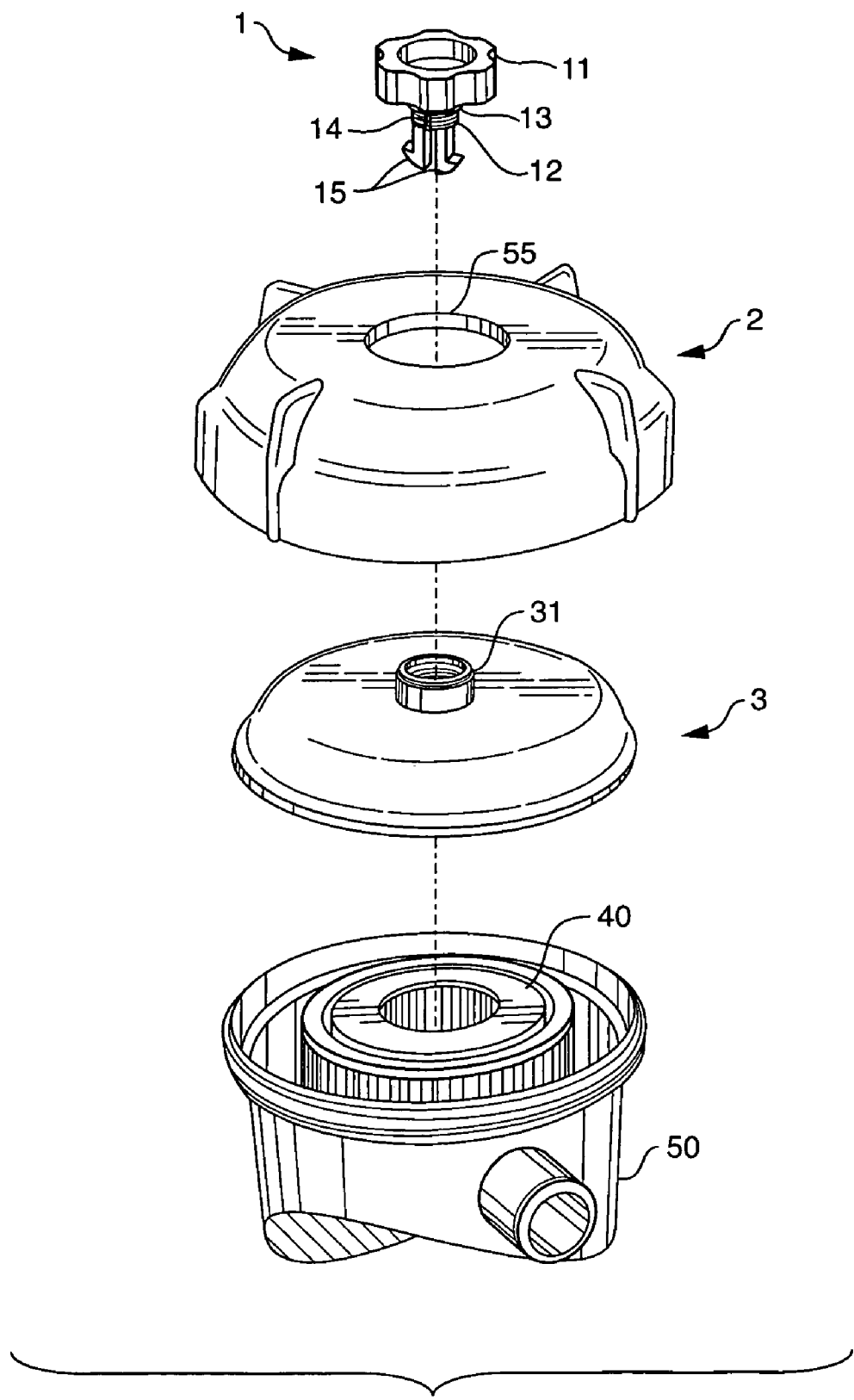
FIG. 1 depicts an exploded view of an embodiment of a filter pump cover employing an embodiment of the air purge valve of the present invention.

FIG. 1 depicts an exploded view of an embodiment of a filter pump cover employing an embodiment of the air purge valve of the present invention. As shown in FIG. 1, the filter pump cover is comprised of air purge valve 1, filter cap 2, and filter cap retainer 3. Air purge valve 1 is comprised of valve cap 11, screw threads 12, and a valve stem having outward-facing inverse hooks 15 at the bottom. Screw threads 12 are interrupted by valve opening slot 14 on one side. Filter cap retainer 3 has hollow part 31 at the center that mates with and holds air purge valve 1. Screw threads 12 mate with corresponding screw threads inside hollow part 31 when the air purge valve is closed. The valve stem has an upper width that is smaller than the inner diameter of hollow part 31 and a lower width at inverse hooks 15 that is smaller than the diameter of hollow part 31. In this manner, inverse hooks 15 fix into hollow part 31, preventing unintentional removal of the valve stem from filter cap retainer 3. Optional fixing slots may be present at the bottom of hollow part 31 for capturing inverse hooks 15. Spaces between inverse hooks 15. enable initial installation and/or subsequent complete removal of valve 1 from cap retainer 3 when desired by squeezing inverse hooks 15 together slightly and/or by pushing them through hollow part 31 on retainer 3.

When in use in a typical system, filter cap retainer 3 holding air purge valve 1 is inserted into the top of filter container 50, which contains replaceable filter element 40. Filter cap retainer 3 is then held in place on filter container 50 by filter cap 2. When the system is assembled, air purge valve 1 remains accessible through hole 55 in the top of filter cap 2. While specific embodiments of a valve cap, a filter cap, a filter cap retainer, and valve stem inverse hooks are shown, it will be clear to anyone of ordinary skill in the art that any suitable form of these elements known in the art may be used with the air purge valve and filter cap of the present invention, as may any suitable filter container and filter element.

In the present invention, air purge valve 1 and filter cap retainer 3 are effectively linked into a single part that makes the air purge valve easy to close. When closed, a tight seal is formed by means of optional purge valve seal 13. To release air, air purge valve 1 is turned counterclockwise within screw threads 12 by means of valve cap 11. Inverse hooks 15 hitch valve 1 to cap retainer 3 to prevent valve 1 from pulling completely out of cap retainer 3. Air is released from the pump system via valve opening slot 14.

Figure 2:
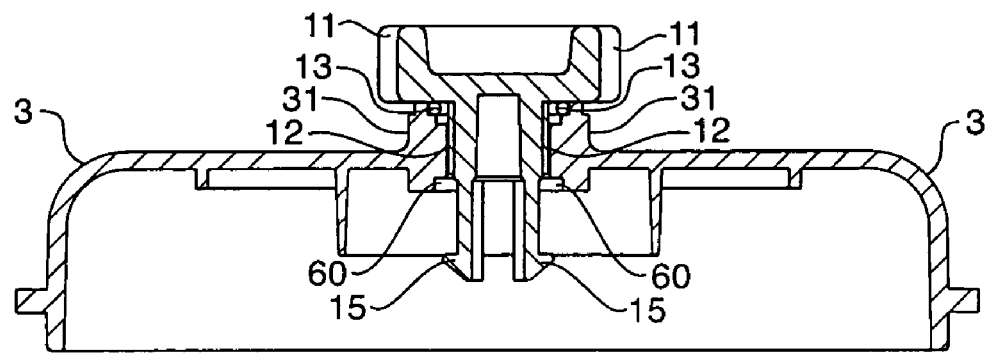
FIG. 2 is a cross section of an embodiment of a filter cap retainer employing an embodiment of the air purge valve of the present invention in the closed position.

FIG. 2 is a cross section of an embodiment of a filter cap retainer employing an embodiment of the air purge valve of the present invention, shown in the closed position. In FIG. 2, the air purge valve is shown screwed into filter cap retainer 3. Air purge valve 1 is comprised of valve cap 11, screw threads 12, and a valve stem having outward-facing inverse hooks 15. Filter cap retainer 3 has protruding hollow part 31 at the center that mates with and holds the air purge valve, with screw threads 12 being mated with corresponding screw threads inside protruding hollow part 31. The valve stem has an upper width that is smaller than the inner diameter of protruding part 31 and a lower width at inverse hooks 15 that is smaller than the diameter of protruding part 31. In this manner, inverse hooks 15 fix into central protruding part 31, preventing unintentional removal of the valve stem from cap retainer 3. Optional fixing slots 60 may be present at the bottom of protruding hollow part 31 for capturing inverse hooks 15 when the valve is opened, in order to prevent removal of the valve stem from cap retainer 3. Spaces between inverse hooks 15 enable initial installation and/or subsequent complete removal when desired by squeezing inverse hooks 15 together slightly and/or by pushing them through protruding part 31 on retainer 3. As the valve is in the closed position, a tight seal is formed by means of optional seal ring 13.

Figure 3:
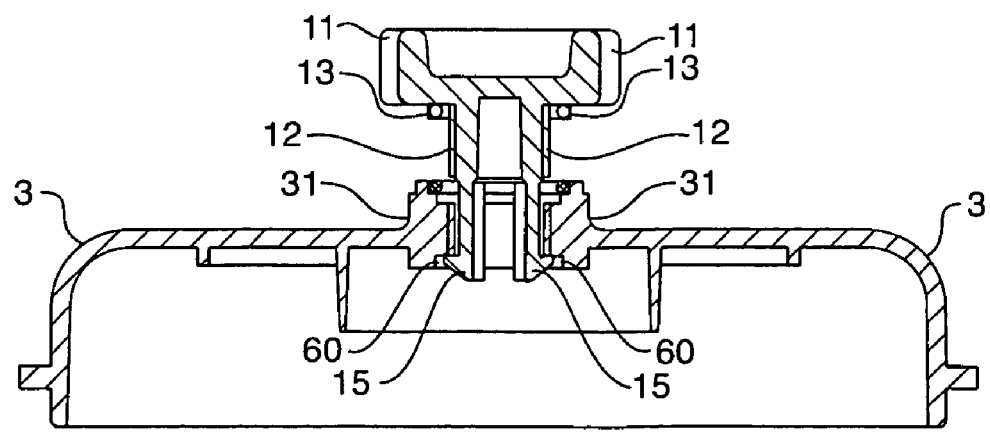
FIG. 3 is a cross section of an embodiment of a filter cap retainer employing an embodiment of the air purge valve of the present invention in the open position.

FIG. 3 is a cross section of an embodiment of a filter cap retainer employing an embodiment of the air purge valve of the present invention, shown in the open position. In FIG. 3, the air purge valve is open and loosely hitched to filter cap retainer 3 by inverse hooks 15. Air purge valve 1 is comprised of valve cap 11, screw threads 12, and a valve stem with outward-facing inverse hooks 15. Filter cap retainer 3 has protruding hollow part 31 at the center that mates with and holds the air purge valve when it is closed. In particular, screw threads 12 are designed to mate with corresponding screw threads inside protruding hollow part 31. The valve stem has an upper width that is smaller than the inner diameter of protruding part 31 and a lower width at inverse hooks 15 that is smaller than the diameter of protruding part 31. Inverse hooks 15 remain fixed into the bottom of central protruding part 31, preventing unintentional removal of the valve stem from retainer 3. Optional fixing slots 60 may be present at the bottom of protruding hollow part 31 for capturing inverse hooks 15. Optional seal ring 13 remains in position to enable formation of a tight seal when the valve is closed.

The air purge valve of the present invention therefore has two modes of operation. By twisting the air purge valve cap, the flow of air and/or water from the pump is either permitted or restricted. Twisting the cap up out of the retainer cap protruding portion allows air to flow from the filter pump through the air purge valve slot and out of the system. Twisting the air purge valve cap into the retainer cap seals the system, preventing air and/or water from flowing from the filter pump.

Figure 4:
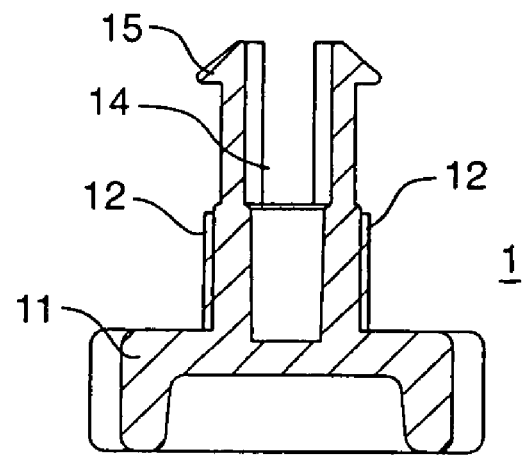
FIG. 4 is a cross section of an embodiment of the air purge valve of the present invention.

FIG. 4 is a cross section of an embodiment of the air purge valve of the present invention. In FIG. 4, air purge valve 1 is comprised of valve cap 11, screw-threaded portion 12, and a valve stem having one or more outward-facing inverse hooks 15 at the bottom. Screw threads 12 are interrupted by a narrow valve opening slot on one side. Screw threads 12 are intended to mate with corresponding screw threads inside a filter retainer cap or other pump element when the air purge valve is closed. The valve stem has an upper width that is smaller than the inner diameter of an opening in a filter retainer cap or other pump element and a lower width at inverse hooks 15 that is smaller than the diameter the opening in the filter retainer cap or other pump element. In this manner, inverse hooks 15 fix into the filter retainer cap or other pump element, preventing unintentional removal of the valve stem. Spaces between inverse hooks 15 enable initial installation and/or subsequent complete removal when desired by squeezing inverse hooks 15 together slightly and/or by pushing them through the opening in the filter retainer cap or other pump element. While two hooks 15 are shown for convenience, any number of hooks that are found to suit a particular application may be used.

Figure 5:
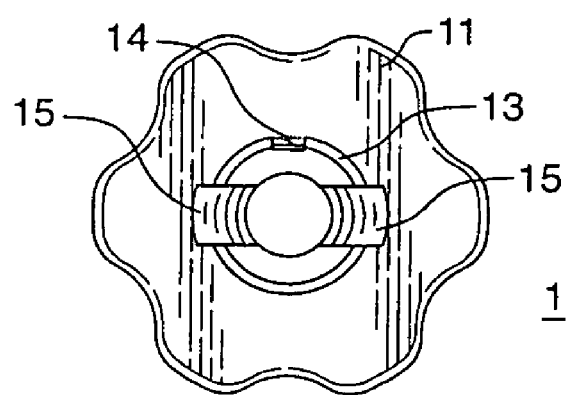
FIG. 5 is a bottom view of an embodiment of the air purge valve of the present invention.

FIG. 5 is a bottom view of an embodiment of air purge valve 1 of the present invention. FIG. 5 depicts valve cap 11 and a two outward-facing inverse hooks 15. While two hooks 15 are shown for convenience, any number of hooks that are found to suit a particular application may be used. Valve opening slot 14 is present on one side and optional seal ring 13 surrounds the valve stem just below the base of cap 11.

The air purge valve of the present invention may be made out of any suitable material known in the art including, but not limited to, those materials known to be suitable for the prior art valves, such as plastics, nylon, metals, including alloys, and composites, such as plastic incorporating carbon fiber, graphite, or carbon Kevlar. The preferred material is acrylonitrile butadiene styrene resin (ABS). The valve of the present invention may be made by any suitable method known in the art including, but not limited to, those methods known to be suitable for manufacturing the prior art valves, such as injection molding or conventional molding. The preferred method of manufacture is injection molding.

The filter pump cover with air purge valve of the present invention may be made out of any suitable material known in the art including, but not limited to, those materials known to be suitable for the prior art valves, such as plastics, nylon, metals, including alloys, and composites, such as plastic incorporating carbon fiber, graphite, or carbon Kevlar. The preferred material is acrylonitrile butadiene styrene resin (ABS). The valve of the present invention may be made by any suitable method known in the art including, but not limited to, those methods known to be suitable for manufacturing the prior art filter caps, such as injection molding or conventional molding. The preferred method of manufacture is injection molding.

The present invention, therefore, provides an air purge valve that has a valve stem that is not easily removed from the valve during use. It further provides a filter pump cover having an air purge valve with an interconnected valve stem that is not easily removable during use. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. An air purge valve, comprising:
   a valve cap;
   a screw-threaded portion connected to the valve cap and being interrupted by at least one valve opening; and
   a valve stem connected at the top to the screw-threaded portion opposite the valve cap and having at least one outward-facing inverse hook at the bottom, the inverse hook being inwardly compressible for insertion into an opening.

2. The air purge valve of claim 1, further comprising a seal ring surrounding the screw-threaded portion and located just below the valve cap.

3. The air purge valve of claim 1, wherein the width of the top of the valve stem is smaller than an opening in an associated filter cap retainer or other pump element and the uncompressed width across the inverse hook and the bottom of the valve stem is wider than the opening of the filter cap retainer or other pump element.

4. The air purge valve of claim 1, wherein there are at least two inverse hooks.

5. A valve, comprising:
   a valve cap having an attached valve cap screw-threaded portion being interrupted by at least one valve opening;
   a filter cap retainer defining a central hollow portion having screw threads that mate with the valve cap screw-threaded portion; and
   a valve stem connected at the top to the bottom of the valve cap screw-threaded portion and having at least one inverse hook at the bottom, the inverse hook being inwardly compressible for insertion through the top of the filter cap retainer central hollow portion, wherein the width of the top of the valve stem is smaller than the width of the filter cap retainer central hollow portion and the uncompressed width across the inverse hook and the bottom of the valve stem is wider than the width of the filter cap retainer central hollow portion.

6. The valve of claim 5, further comprising a seal ring surrounding the valve cap screw-threaded portion and located just below the valve cap.

7. The valve of claim 6, further comprising at least one fixing slot at the bottom of the filter cap retainer central hollow portion.

8. The valve of claim 5, further comprising at least one fixing slot at the bottom of the filter cap retainer central hollow portion.

9. The valve of claim 5, wherein there are at least two inverse hooks.

10. A filter pump cover comprising:
    a filter cap;
    a valve cap accessible through an opening of the filter cap;
    a screw-threaded portion connected at the bottom of the valve cap and being interrupted by at least one valve opening;
    a filter cap retainer defining a central hollow portion having screw threads that mate with the screw-threaded portion; and
    a valve stem connected at the top to the bottom of the screw-threaded portion and having at least one inverse hook at the bottom, the inverse hook being inwardly compressible for insertion through the top of the filter cap retainer central hollow portion, wherein the width of the top of the valve stem is smaller than the width of the filter cap retainer central hollow portion and the uncompressed width across the inverse hook and the bottom of the valve stem is wider than the width of the filter cap retainer central hollow portion.

11. The filter pump cover of claim 10, further comprising a seal ring surrounding the screw-threaded portion and located just below the valve cap.

12. The filter pump cover of claim 11, further comprising at least one fixing slot at the bottom of the filter cap retainer central hollow portion.

13. The filter pump cover of claim 10, further comprising at least one fixing slot at the bottom of the filter cap retainer central hollow portion.

14. The filter pump covers of claim 10, wherein there are at least two inverse hooks.

* * * * *